United States Patent
Yoshioka

(10) Patent No.: US 6,960,071 B2
(45) Date of Patent: Nov. 1, 2005

(54) MOLD THICKNESS ADJUSTMENT MECHANISM FOR INJECTION MOLDING MACHINE

(75) Inventor: Mitsushi Yoshioka, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 148 days.

(21) Appl. No.: 10/426,815

(22) Filed: May 1, 2003

(65) Prior Publication Data
US 2004/0013766 A1 Jan. 22, 2004

(30) Foreign Application Priority Data
Jul. 17, 2002 (JP) ........................................ 2002-207984

(51) Int. Cl.$^7$ .............................................. B29C 45/17
(52) U.S. Cl. ...................................................... 425/190
(58) Field of Search ................................ 425/190, 589, 425/595

(56) References Cited

U.S. PATENT DOCUMENTS 6,224,367 B1 * 5/2001 Maier ...................... 425/451.6

FOREIGN PATENT DOCUMENTS

| DE | 198 12 741 A1 | 9/1999 |
| GB | 638133 | 5/1950 |
| JP | 2-018009 | 1/1990 |
| JP | 11-170321 | 6/1999 |
| JP | 2002-66697 | 3/2002 |

OTHER PUBLICATIONS

Chinese First Examination Report for Corresponding Chinese Application Serial No. 031482279 citing Japanese Patent Application No. JP2002–66697.

* cited by examiner

Primary Examiner—James P. Mackey
(74) Attorney, Agent, or Firm—Staas & Halsey LLP

(57) ABSTRACT

A fixed platen and a rear platen of an injection molding machine are connected to each other via tie bars. A coil spring is disposed between the tie bar and the rear platen such that the rear platen is urged in a direction away from the fixed platen. A mold thickness adjusting member such as a nut is also provided for causing the rear platen to move along the tie bar toward the fixed platen against the resilience of the urging means.

7 Claims, 2 Drawing Sheets

MOLD THICKNESS ADJUSTMENT MECHANISM FOR INJECTION MOLDING MACHINE

BACKGROUND OF THE INVENTION

1. Field of the Invention

The present invention relates to a mold thickness adjustment mechanism for an injection molding machine comprising a toggle type mold clamping system.

2. Description of the Prior Art

In a toggle type mold clamping system of an injection molding machine, a fixed platen and a rear platen are connected by a plurality of tie bars, and a movable platen which is provided slidably with respect of the tie bars is driven by the toggle mechanism to clamp together a fixed die attached to the fixed platen and a movable die attached to the movable platen.

The toggle type mold clamping system is disposed between the rear platen and the movable platen, and the movement range of the movable platen which is driven by the toggle type mold clamping system is limited. The clamp completion position of the dies which are respectively attached to the fixed platen and movable platen is normally set as a locked-up state in which a toggle link of the toggle type mold clamping system is fully extended, and at this time the tie bars are extended by the toggle type mold clamping system such that a reaction force generated thereby serves as a mold clamping force. In order to obtain a set mold clamping force in a state where the toggle link is fully extended, the distance between the fixed platen and the rear platen must be adjusted by adjusting the position of the rear platen with respect of the fixed platen by means of the thickness of the dies in use and the set mold clamping force.

The distance between the fixed platen and rear platen is adjusted conventionally using a mold thickness adjusting motor to cause the rear platen to move toward the tie bars or away from the tie bars.

In applications to an injection molding machine, however, the dies may not be exchanged, and even if the dies are exchanged the mold thickness may not be modified and the mold clamping force may not be altered. Although an injection molding machine may almost never use a mold thickness adjustment mechanism, the machine is provided with a complex electrically driven mold thickness adjustment mechanism, thus making the injection molding machine itself an expensive item.

Hence the removal of the electrically driven mold thickness adjustment mechanism itself from an injection molding machine which is used when the dies are not exchanged or the mold thickness is not modified even if the dies are exchanged has been considered.

FIG. 2 is a schematic diagram of a mold clamping system not provided with a mold thickness adjustment mechanism. In FIG. 2, a rear platen 1 and a fixed platen 2 are connected by a plurality of tie bars 4. A movable platen 3 is slidably disposed on these tie bars 4. A toggle type mold clamping system is disposed between the rear platen 1 and movable platen 3, but is omitted from FIG. 2.

The distance between the rear platen 1 and fixed platen 2 is fixed, and the movable platen 3 is advanced (moved toward the fixed platen 2) by driving the toggle type mold clamping system which is provided between the rear platen 1 and movable platen 3 such that the movable platen 3 reaches a maximum position of advancement in a locked-up state where a toggle link is fully extended. Since the distance between the rear platen 1 and fixed platen 2 is fixed, the distance between the movable platen 3 and fixed platen 2 at this time is also fixed. In this locked-up state, a fixed side die 5a attached to the fixed platen 2 and a movable side die 5b attached to the movable platen 3 are clamped together such that a set mold clamping force is generated.

Even when a predetermined mold clamping force is obtained by fixing the mold thickness and locking up the toggle link of the toggle type mold clamping system such that the tie bars are extended by a predetermined amount, it may be necessary to modify the mold clamping force in accordance with the projected area of the molded product. In such a case, a spacer 6 of a predetermined thickness, for example, is used as shown in FIG. 2 such that the movable side die 5b is attached to the movable platen 3 via the spacer 6 to substantially alter the mold thickness. By adjusting the mold thickness, the set mold clamping force is obtained. Note that FIG. 2 illustrates a state in which the toggle link of the toggle type mold clamping system is fully extended such that the die 5 (the fixed die 5a and movable die 5b) are clamped together in a locked-up state.

By interposing the spacer 6 between the movable platen 3 and the movable side die 5b as shown in FIG. 2, the distance by which the mold thickness can be adjusted is equal to the thickness of the spacer 6. In order to obtain various different mold clamping forces while using a die having the same mold thickness, a plurality of spacers 6 having different thicknesses must be prepared and used appropriately. Alternatively, a plurality of spacers having a thickness of approximately several millimeters may be prepared and used stacked together to obtain a spacer of a predetermined thickness.

However, it is laborious to prepare a plurality of spacers having different thicknesses, and when a plurality of spacers are used stacked together, the margin of error accumulates such that an accurate mold clamping force cannot be obtained.

OBJECT AND SUMMARY OF THE INVENTION

An object of the present invention is to provide a mold thickness adjustment mechanism of a simple constitution which is capable of adjusting mold thickness when a die is altered or the mold clamping force is modified.

In order to achieve this object, a mold thickness adjustment mechanism for an injection molding machine according to the present invention comprises urging means disposed between a tie bar and a rear platen or a fixed platen for urging the rear platen or fixed platen in a direction away from the fixed platen or rear platen, and a mold thickness adjusting member for causing the rear platen or fixed platen to move along the tie bar toward the fixed platen or rear platen against the resilience of the urging means.

The mold thickness adjustment mechanism may also take the following embodiments.

A through hole for insertion of the tie bar which is formed in the rear platen or fixed platen is constituted by a large diameter portion and a small diameter portion, the urging means are housed in the large diameter portion thereof, and the mold thickness adjusting member is provided on the tie bar which passes through the through hole.

The urging means are constituted by a spring member comprising a coil spring.

A reduced diameter portion is formed on the distal end of the tie bar and the coil spring serving as the urging means is housed in a space formed between this reduced diameter portion and the large diameter portion of the through hole.

The mold thickness adjusting member is a nut which is screwed onto a male screw portion formed on the distal end portion of the tie bar which passes through the tie bar through hole to protrude outside from the rear platen or fixed platen.

A collar body is provided in the center of the tie bar and the urging means are disposed between this collar body and the rear platen or fixed platen.

A female screw is formed in the distal end portion of the tie bar and the mold thickness adjusting member is constituted by a bolt having a male screw formed on the distal end thereof which is screwed into the female screw.

According to the present invention, a simply constructed mold thickness adjustment mechanism which is not an electrically driven mechanism having a complicated structure can be obtained.

DETAILED DESCRIPTION OF THE PREFERRED EMBODIMENTS

Figure 1:
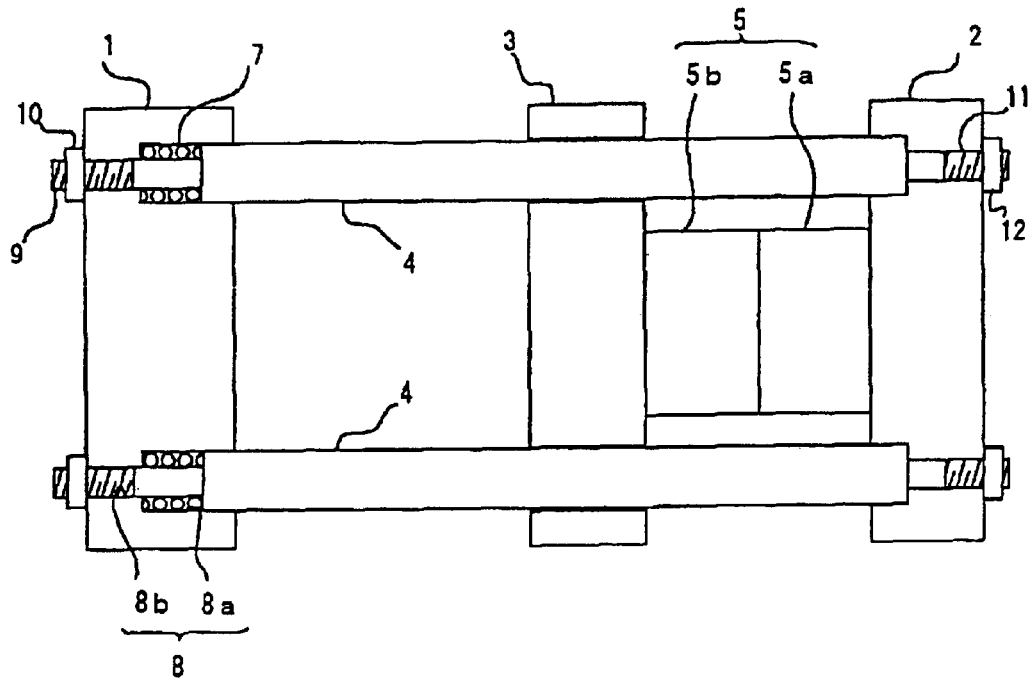
FIG. 1 is a schematic diagram of a mold thickness adjustment mechanism according to one embodiment of the present invention.

FIG. 1 is a schematic diagram showing one embodiment of a mold thickness adjustment mechanism according to the present invention. Identical elements to the example shown in FIG. 2 have been allocated identical reference symbols. The mold thickness adjustment mechanism shown in FIG. 1 differs from the mold thickness adjustment mechanism shown in FIG. 2 in that urging means are interposed between a rear platen 1 and tie bars 4.

The rear platen 1 and a fixed platen 2 are connected by a plurality of tie bars 4. A movable platen 3 is slidably disposed on the tie bars 4. A fixed side die 5a and a movable side die 5b are attached to the fixed platen 2 and the movable platen 3 respectively. A toggle type mold clamping system, although not shown in the drawing, is disposed between the rear platen 1 and movable platen 3, and the movable platen 3 advances and retreats along the tie bars by means of this toggle type mold clamping system. Regarding the above points, the constitution in FIG. 1 is identical to that shown in FIG. 2.

In this embodiment, as shown in FIG. 1, a tie bar through hole 8 in the rear platen 1 is constituted by a large diameter portion 8a and a small diameter portion 8b. The large diameter portion 8a is on the movable platen side. The two end portions of each tie bar 4 (a first end portion and a second end portion) are reduced in diameter, and male screw portions 9, 11 are formed respectively on the first and second end portions of the reduced-diameter parts.

An elastic member serving as urging means is housed in the large diameter portion 8a of the through hole 8 which is formed in the rear platen 1. In this embodiment a coil spring 7 is housed therein as the urging means. The coil spring 7 which is housed in the large diameter portion 8a of the tie bar through hole 8 is seated on the step face between the large diameter portion 8a and small diameter portion 8b of the tie bar through hole 8.

The reduced-diameter first end portion of the tie bar 4 passes through the center of the coil spring 7 which is housed in the through hole large diameter portion 8a of the rear platen 1, then passes through the small diameter portion 8b, and then protrudes outward from the surface of the rear platen 1 opposite to the movable platen 3 side. A nut 10 is then screwed onto the male screw portion 9 formed on the reduced-diameter first end portion of the tie bar 4 which protrudes outward from the rear platen 1, whereby the tie bar 4 is fixed to the rear platen 1. At this time, a part of the large diameter portion of the tie bar 4 is loosely fitted into the large diameter portion 8a of the through hole 8 provided in the rear platen 1 such that the coil spring 7 is housed inside the large diameter portion 8a in a compressed state.

The male screw portion 11 which is formed on the second end portion of the tie bar 4 passes through a through hole formed in the fixed platen 2 to protrude outward from the surface of the fixed platen 2 opposite to the movable platen 3 side. A nut 12 is screwed onto the male screw portion 11 formed on the second end portion of the tie bar 4 which protrudes outward from the fixed platen 2, whereby the tie bar 4 is fixed to the fixed platen 2.

According to the above constitution, the rear platen 1 is connected to the fixed platen 2 via the plurality of tie bars 4 so as to be biased in a direction away from the fixed platen 2 by the coil spring 7 (urging means) which is housed in the through hole 8 of the rear platen 1.

When the fixed side die 5a and movable side die 5b are attached to the fixed platen 2 and the movable platen 3 respectively and the mold thickness is adjusted to obtain a set clamping force, the amount of tightening of the nut 10 onto the male screw portion 9 is adjusted. When the nut 10 is tightened, the rear platen 1 moves along the tie bar 4 toward the fixed platen against the resilience of the coil spring 7. As a result the distance between the rear platen 1 and fixed platen 2 is reduced.

When the mold thickness adjustment amount is to be further increased, a spacer 6 of a predetermined thickness is used such that the movable side die 5b is attached to the movable platen 3 via the spacer 6, whereby the mold thickness is substantially altered. In other words, mold thickness adjustment is performed using the spacer 6 of a predetermined thickness by altering the distance between the fixed platen 2 and the movable platen 3 when the fixed side die 5a and movable side die 5b are closed together.

In this embodiment, as described above, mold thickness adjustment is performed by means of the amount of tightening of the nut 10 onto the male screw portion 9, and a spacer is also used according to necessity.

In the embodiment described above, urging means (the coil spring 7) are disposed on the rear platen 1 side, but the urging means may instead be disposed on the fixed platen 2 side. More specifically, a through hole constituted by a large diameter portion and a small diameter portion is formed in the fixed platen 2 and a coil spring is housed in the large diameter portion of the through hole. A nut is then screwed onto a male screw portion formed on the second end portion of the tie bar 4 which protrudes outward through the small diameter portion of the through hole in the fixed platen 2, and by tightening or loosening this nut the mold thickness is adjusted.

Instead of the coil spring described above, another elastic member which is capable of generating repulsion when compressed may be used as the urging means.

Figure 3:
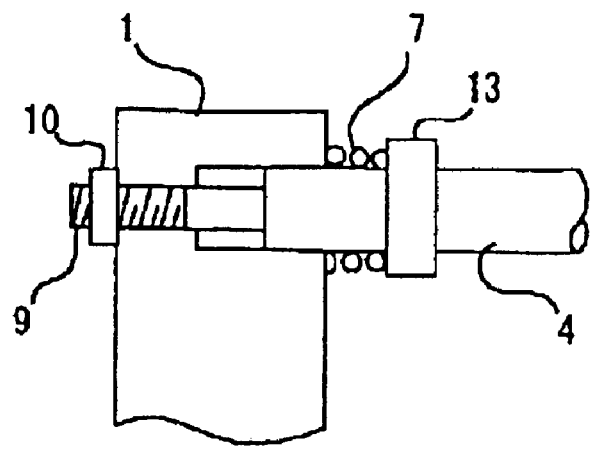
FIG. 3 is a schematic diagram of another embodiment of the present invention.

In the embodiment described above, the urging means (coil spring 7) are housed in the large diameter portion of the tie bar through hole formed in the rear platen 1 (or the fixed platen 2), but instead, as shown in FIG. 3, a collar body 13 may be provided on the tie bar 4 and the coil spring 7 may be disposed between the collar body 13 and the rear platen 1 or the collar body 13 and the fixed platen 2. In FIG. 3, when the nut 10 which is screwed onto the male screw portion 9 formed on the first end portion of the tie bar 4 is tightened, the rear platen 1 moves along the tie bar 4 toward the fixed platen against the resilience of the coil spring 7, and thus mold thickness adjustment is performed.

Figure 2:
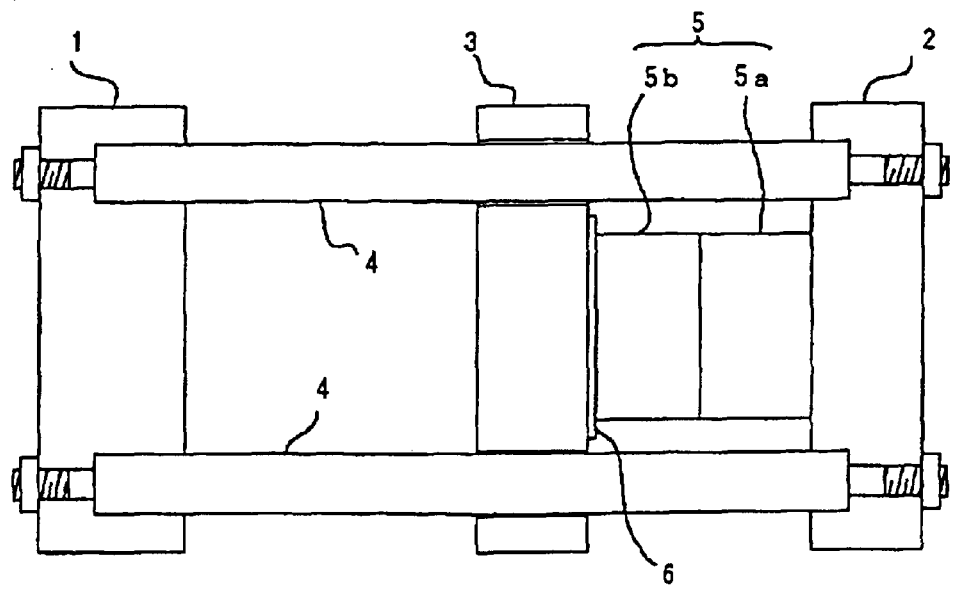
FIG. 2 is a schematic diagram of a conventional mold clamping system not provided with an electrically driven mold thickness adjustment mechanism which performs mold thickness adjustment using a spacer.
Figure 4:
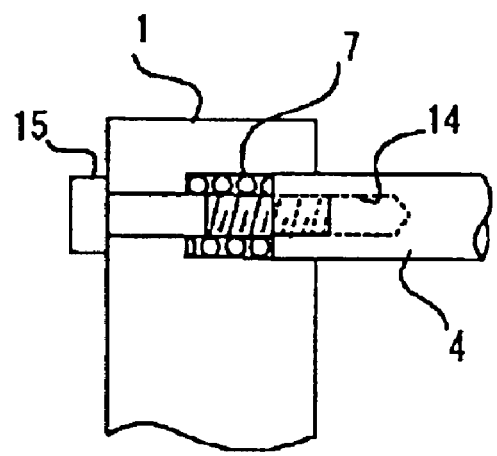
FIG. 4 is a schematic diagram of a further embodiment of the present invention.

In the embodiments in FIGS. 1 and 2, mold thickness adjustment is performed by tightening a nut which is screwed onto a male screw portion formed on the end portion of the tie bar 4 which protrudes from the rear platen (or the fixed platen), but instead, as shown in FIG. 4, a female screw portion 14 may be formed in the interior of the tie bar 4 end portion and a male screw portion which is formed on the distal end of a bolt 15 may be screwed into the female screw portion 14 from the outside of the rear platen (or fixed platen). A coil spring 7 is housed in a large diameter portion of a though hole formed in the rear platen 1 (or fixed platen 2), and the bolt 15 passes through the center of the coil spring 7. Then, when the bolt 15 is tightened, the rear platen 1 (or fixed platen 2) moves along the tie bar 4 toward the fixed platen (or the rear platen 1) against the resilience of the coil spring 7, whereby mold thickness adjustment is performed.

According to the present invention as described above, a reasonably priced and simply constructed mold thickness adjustment mechanism can be obtained without the need for an electrically driven mold thickness adjustment mechanism.

What is claimed is:

1. A mold thickness adjustment mechanism for an injection molding machine for adjusting a gap between a fixed platen and a rear platen which are connected to each other via a tie bar, comprising:

urging means disposed between said tie bar and the rear platen or fixed platen for urging the rear platen or fixed platen in a direction away from the fixed platen or rear platen; and a mold thickness adjusting member for causing the rear platen or fixed platen to move along the tie bar toward the fixed platen or rear platen against the resilience of said urging means.

2. The mold thickness adjustment mechanism for an injection molding machine according to claim 1, wherein a through hole for passing the tie bar therethrough, which is formed in said rear platen or fixed platen, is constituted by a large diameter portion and a small diameter portion, said urging means are housed in the large diameter portion thereof, and said mold thickness adjusting member is provided on the tie bar which passes through said through hole.

3. The mold thickness adjustment mechanism for an injection molding machine according to claim 1, wherein said urging means are constituted by a spring member comprising a coil spring.

4. The mold thickness adjustment mechanism for an injection molding machine according to claim 2, wherein a reduced diameter portion is formed on the distal end of said tie bar and a coil spring serving as said urging means is housed in a space formed between this reduced diameter portion and the large diameter portion of said through hole.

5. The mold thickness adjustment mechanism for an injection molding machine according to claim 1, wherein said mold thickness adjusting member is a nut which is screwed onto a male screw portion formed on the distal end portion of the tie bar which passes through a tie bar through hole to protrude outside from the rear platen or fixed platen.

6. The mold thickness adjustment mechanism for an injection molding machine according to claim 1, wherein a collar body is provided in the middle of the tie bar and said urging means are disposed between this collar body and the rear platen or fixed platen.

7. The mold thickness adjustment mechanism for an injection molding machine according to claim 1, wherein a female screw is formed in the distal end portion of said tie bar and said mold thickness adjusting member is constituted by a bolt having a male screw formed on the distal end thereof which is screwed into the female screw.

* * * * *